United States Patent
Wang

(10) Patent No.: US 7,461,019 B2
(45) Date of Patent: Dec. 2, 2008

(54) SYSTEM AND METHOD FOR INTEGRATION OF MATERIAL COSTS OF A PRODUCT

(75) Inventor: Juei-Mei Wang, Tu-Chen (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 735 days.

(21) Appl. No.: 10/748,312

(22) Filed: Dec. 29, 2003

(65) Prior Publication Data
US 2004/0143487 A1 Jul. 22, 2004

(30) Foreign Application Priority Data
Dec. 27, 2002 (TW) ............................... 91137594 A

(51) Int. Cl.
*G06Q 10/00* (2006.01)
*G06F 19/00* (2006.01)

(52) U.S. Cl. ..................... 705/29; 705/400; 705/7; 700/107

(58) Field of Classification Search ............ 705/29, 705/400, 1; 700/107
See application file for complete search history.

(56) References Cited

U.S. PATENT DOCUMENTS

| | | | | |
|---|---|---|---|---|
| 5,197,001 A * | 3/1993 | Mukherjee | ................... | 705/29 |
| 6,119,102 A * | 9/2000 | Rush et al. | ................... | 705/29 |
| 7,058,587 B1 * | 6/2006 | Horne | ............................ | 705/7 |
| 2001/0023418 A1 * | 9/2001 | Suzuki et al. | ............... | 705/400 |
| 2002/0026392 A1 * | 2/2002 | Shimizu et al. | ............... | 705/29 |
| 2002/0069103 A1 | 6/2002 | Puri | | |
| 2002/0087378 A1 | 7/2002 | Como | | |
| 2002/0087490 A1 * | 7/2002 | Ueda et al. | ................... | 705/400 |
| 2002/0116348 A1 * | 8/2002 | Phillips et al. | ............... | 705/400 |
| 2003/0009410 A1 * | 1/2003 | Ramankutty et al. | ........... | 705/37 |
| 2003/0037014 A1 * | 2/2003 | Shimizu et al. | ............. | 705/400 |
| 2003/0167238 A1 * | 9/2003 | Zeif | ........................... | 705/400 |
| 2003/0172008 A1 * | 9/2003 | Hage et al. | ..................... | 705/28 |
| 2004/0143488 A1 * | 7/2004 | Wang | ........................... | 705/10 |

OTHER PUBLICATIONS

Greene, Production and Inventory Control Handbook, Third Edition, McGraw Hill, copyright 1997, p. 27.6.*
Banker et al., Product Costing and Pricing, The Accounting Review, vol. 69, No. 3, Jul. 1994, pp. 479-494.*

(Continued)

*Primary Examiner*—John W Hayes
*Assistant Examiner*—Daniel P Vetter
(74) *Attorney, Agent, or Firm*—Wei Te Chung

(57) ABSTRACT

A system for integration of material costs of a product (1) can calculate material costs of a product according to purchase data, inventory data and material consumption data. The system for integration of material costs of a product is connected to a number of client terminals (3), a purchase management system (6), an inventory management system (8) and a production management system (9) via a network (2). The system for integration of material costs of a product includes a web server (12), a database server (14), and a database (16). The web server is connected to the database server, which contains the database. The web server stores a number of software function modules for receiving and processing data from the client terminals, and for returning results to the client terminals after processing. A related method is also provided.

13 Claims, 6 Drawing Sheets

OTHER PUBLICATIONS

Sridharan et al., Freezing the Master Production Schedule under Rolling Planning Horizons, Management Science, vol. 33, No. 9, Sep. 1987, pp. 1137-1149.*

Park et al., Proceedings of DETC'03 ASME 2003 Design Engineering Technical Conferences and Computers and information in Engineering Conference, Chicago, Illinois, Sep. 2-6, 2003, Production Cost Modeling to Support Product Family Design Optimization, pp. 1-10.*

* cited by examiner

SYSTEM AND METHOD FOR INTEGRATION OF MATERIAL COSTS OF A PRODUCT

BACKGROUND OF THE INVENTION

1. Field of the Invention

The present invention relates to a system and method for costs accounting management, and especially to a system and method for integration of material costs of a manufactured product.

2. Background of the Invention

During the 1970s and 1980s, many private enterprises were able to prosper while paying relatively little attention to cost management. This was particularly the case with smaller manufacturing companies that were not significantly affected by international competition. Since that time, consolidation and corporate takeovers have led to the emergence of numerous large-scale enterprises, whose commercial activities are correspondingly complex and increasingly subject to intense international competition. When certain of these companies have been able to increase revenue but without enjoying corresponding increases in profit, their competence in the area of cost management has been called into question. As one of the most important aspects of corporate management, effective cost management is closely related to cost analysis and profit distribution. Cost management is fundamental to the competence and development of virtually every company.

At present, there are many types of computer systems and management methods related to cost management. Most of these systems and methods focus on collecting cost data, and adopting a single type of or simplified apportionment standard such as direct labor work time, machine work time etc. in order to apportion costs to a production costs center and then to a product. For example, U.S. Patent Application Publication No. 2002/0069103 published on Jun. 6, 2002 provides "Methods and Systems Enabling the Identification of Actual Costs in a Transaction Based Financial and Manufacturing Environment." The disclosed method and system collects material costs data of at least one operation and material costs data of at least one material from a business activity, gives each cost an identifier which corresponds to an operation or a material in the business activity, stores the material costs data according to the identifiers, and then displays an output according to the material costs data. However, this method can lead to underestimations or overestimations of product costs, and result in undercharging or overcharging of customers. The resulting inconsistencies between product costs and revenues from customers can cause corporate management to make wrong decisions.

What is needed is a system and method of cost management which overcomes the above-described problems.

SUMMARY OF THE INVENTION

Accordingly, a main objective of the present invention is to provide a system and method for integration of material costs of a product which, on the basis of purchase data, inventory data and material consumption data, calculates current period purchase costs and historical purchase costs of each unit of each material of a product, and sums up all of the material costs consumed in the product to obtain material costs of the product.

To achieve the above objective, a system for integration of material costs of a product is provided. The system comprises a web server and a database server. The database server comprises a database for storing the purchase data, the inventory data, and the material consumption data. The purchase data include columns for: purchase date, part number of the material, material name, quantity of purchased material, unit price of purchased material, and purchase expenses. The inventory data include columns for: part number of the material, material name, initial inventory quantity, and initial inventory value. The material consumption data include columns for: product name, part number of the product, production quantity, and material consumption quantity of the product.

The web server comprises a purchase data summarizing module for summing up the purchase data of each material in the current period; a current period purchase costs calculation module for calculating purchase expenses and purchase costs apportioned to each unit of each material; a historical purchase costs calculation module for calculating a historical purchase costs of each material; a material costs integration module for calculating material costs consumption in each unit of a product; and a material costs enquiry module for obtaining data on each material's costs, the historical purchase costs of each material, and the current period purchase costs of each material.

The present invention also provides a method for integration of material costs of a product. The method integrates the product's material costs based on the purchase data, the inventory data, and the product consumption data. The method includes the steps of: (a) obtaining purchase data and storing the data in the database; (b) calculating unit purchase expenses and current purchase material costs apportioned to each unit of each material based on the purchase data; (c) obtaining inventory data and storing the inventory data in the database; (d) calculating historical purchase costs of each unit of each material based on the inventory data; (e) obtaining material consumption data and storing the material consumption data in the database; (f) calculating costs of each material consumed in the product based on the material consumption data; and (g) summing up the costs of each material consumed in the product to obtain the material costs of the product.

Based on a company's purchase data, inventory data, and material consumption data, the system and method for integration of material costs of a product can calculate a current period's purchase costs and historical purchase costs of each unit of each material of a product, sum up all of the material costs consumed in the product, and obtain material costs of the product. A company employing the system can thus obtain information on each material's distribution, a current period's purchase costs of each unit of each material of a product, and historical purchase costs of each unit of each material. This provides invaluable information to enable the company to make well-founded strategic business decisions.

Other objects, advantages and novel features of the present invention will be drawn from the following detailed description of preferred embodiments of the present invention with the attached drawings, in which:

BRIEF DESCRIPTION OF THE DRAWINGS

FIGS. 4-1 and 4-2 in combination are a data flowchart in accordance with the preferred embodiment of the present invention.

DETAILED DESCRIPTION OF PREFERRED EMBODIMENTS OF THE INVENTION

Reference will now be made to the drawings to describe the present invention in detail.

Figure 1:
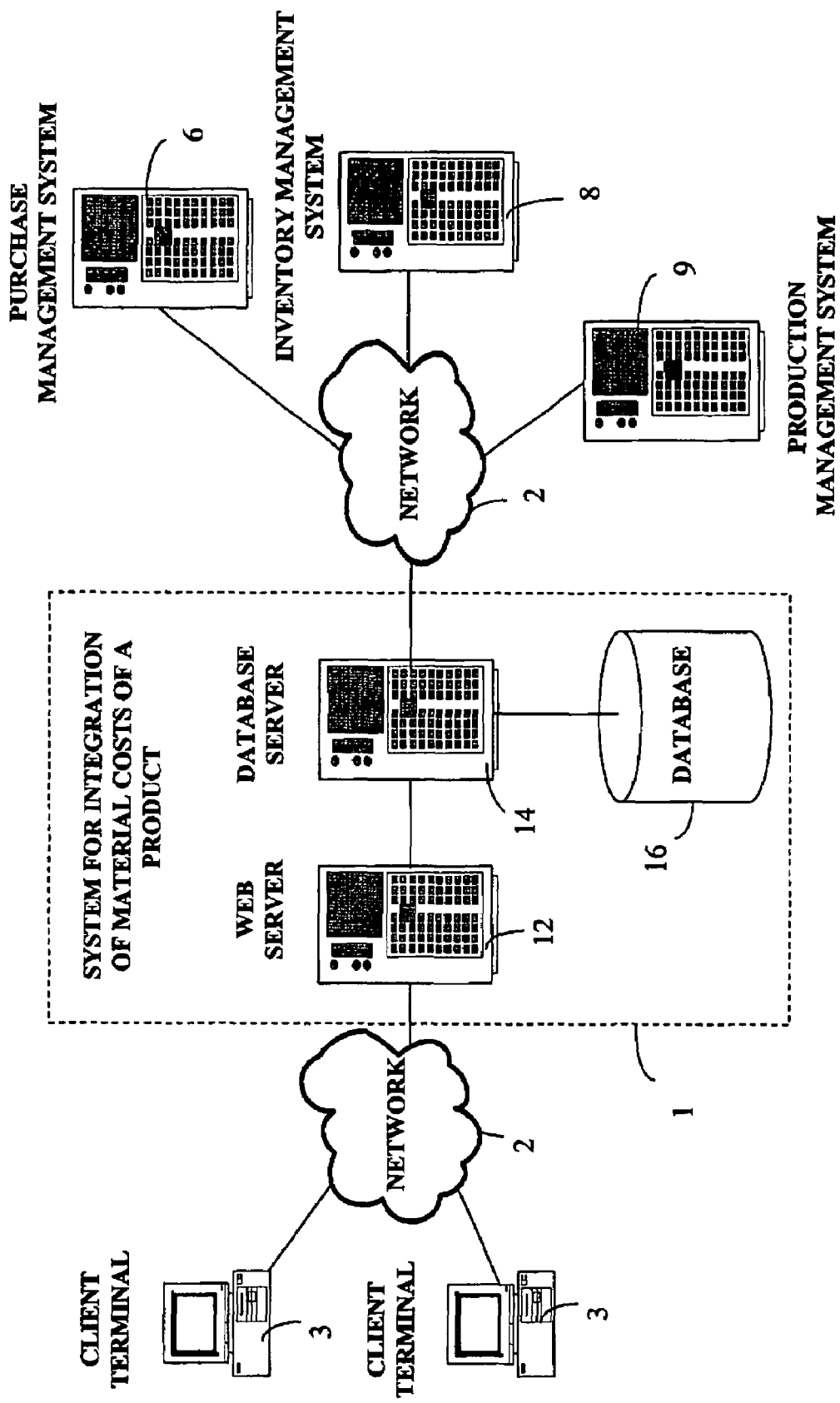
FIG. 1 is a schematic diagram of an application environment including a system for integration of material costs of a product in accordance with a preferred embodiment of the present invention.

FIG. 1 is a schematic diagram of an application environment including a system for integration of material costs of a product 1 (hereafter simply referred to as the system 1) in accordance with the preferred embodiment of the present invention. The system 1 is connected to a plurality of client terminals 3, a purchase management system 6, an inventory management system 8 and a production management system 9 via a network 2. The system 1 comprises a web server 12, a database server 14, and a database 16. The system 1 uses a web-based solution; i.e. an application program of the system 1 runs on the web server 12. Using Internet access software installed in the client terminals 3, users of the system 1 such as cost management personnel and supervisors can log in the web server 12 via the network 2 with a www (world wide web) address. The users can then perform all required operations within the system 1 and obtain relevant data. The operations include purchase data summarizing, current period purchase costs calculations, historical purchase costs calculations, and material costs integration. The data includes purchase data, inventory data, material consumption data, a current period purchase costs list, a historical purchase costs list, and an integrated material costs list. The Internet access software is Internet Explorer from Microsoft Corp. or Navigator from Netscape Corp. The network 2 is the Internet or an intranet.

The web server 12 is connected to the database server 14, which contains the database 16. The database 16 stores relevant data of the system 1 such as the purchase data, the inventory data, the material consumption data, the current period purchase costs list, the historical purchase costs list, and the integrated material costs list. A detailed structure of the database 16 is described below with reference to FIG. 3.

The database server 14 is connected to the purchase management system 6, the inventory management system 8, and the production management system 9 via the network 2 for data transmission therebetween. The database server 14 can receive the purchase data from the purchase management system 6, the inventory data from the inventory management system 8, and the material consumption data from the production management system 9.

Figure 2:
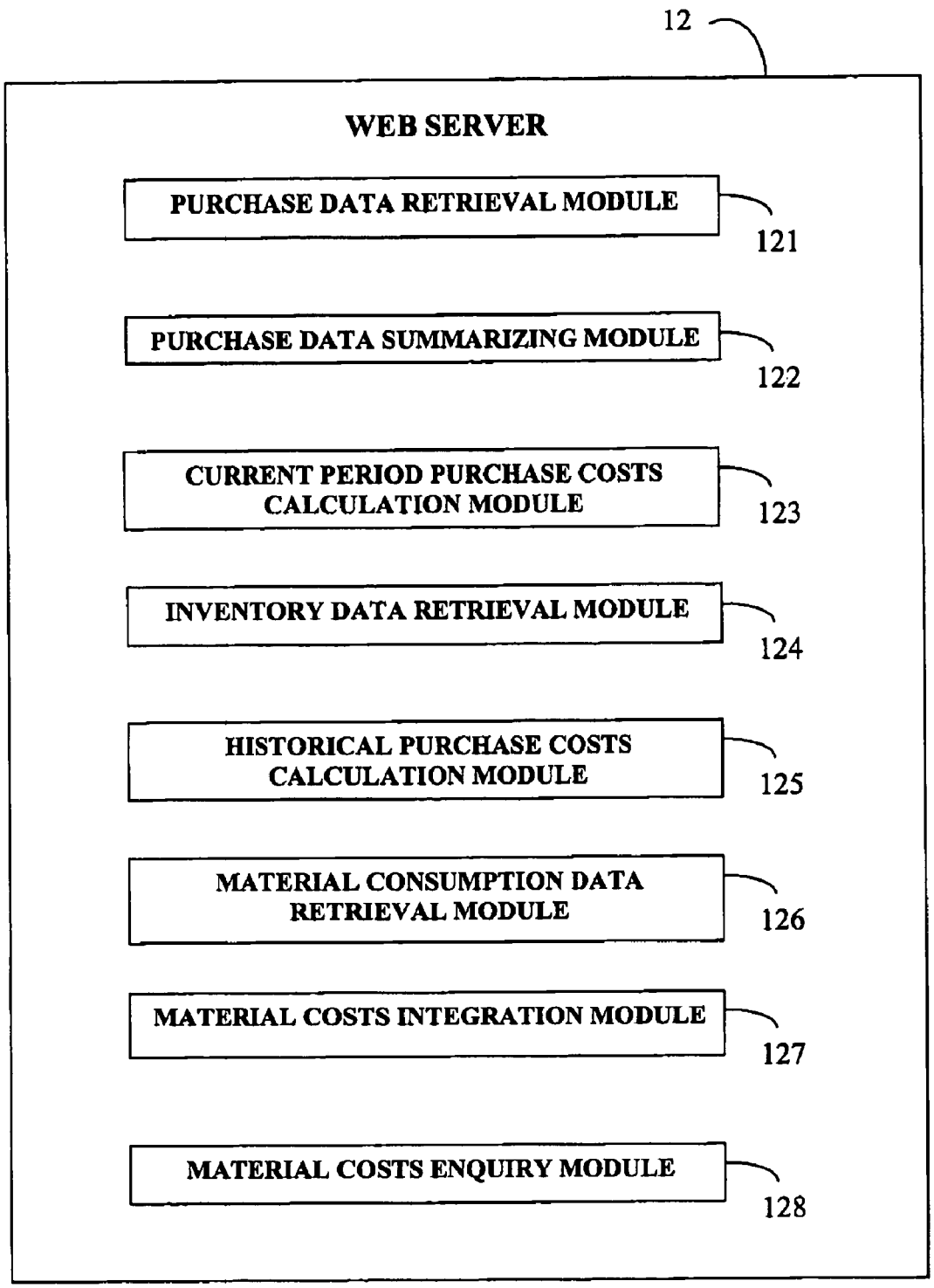
FIG. 2 is a schematic diagram of function modules of a web server of the system of FIG. 1.

FIG. 2 is a schematic diagram of function modules of the web server 12. In the preferred embodiment, as an application server layer, the web server 12 includes core and volatile enterprise logic (plans, operation methods, management models etc.). The web server 12 also stores a number of software function modules for receiving and processing data from the client terminals 3, and for returning results to the client terminals 3 after processing. The web server 12 comprises a purchase data retrieval module 121, a purchase data summarizing module 122, a current period purchase costs calculation module 123, an inventory data retrieval module 124, a historical purchase costs calculation module 125, a material consumption data retrieval module 126, a material costs integration module 127, and a material costs enquiry module 128.

The purchase data retrieval module 121 is used for obtaining current period purchase data of a material from the purchase management system 6. The purchase data summarizing module 122 is used for summing up purchase data of the material in the current period. The current period purchase costs calculation module 123 is used for calculating purchase expenses and purchase costs apportioned to each unit of each material and a corresponding purchase cost in a current period. The inventory data retrieval module 124 is used for obtaining current period inventory data. The historical purchase costs calculation module 125 is used for calculating historical purchase costs of each material. The material consumption data retrieval module 126 is used for obtaining current period material consumption data of a product. The material costs integration module 127 is used for calculating all materials' costs consumption in each unit of the product. The material costs enquiry module 128 can be queried to obtain data on each material's costs, the historical purchase costs of each material, and the current period purchase costs of each material. A detailed description of each module is provided below with reference to FIG. 4.

Figure 3:
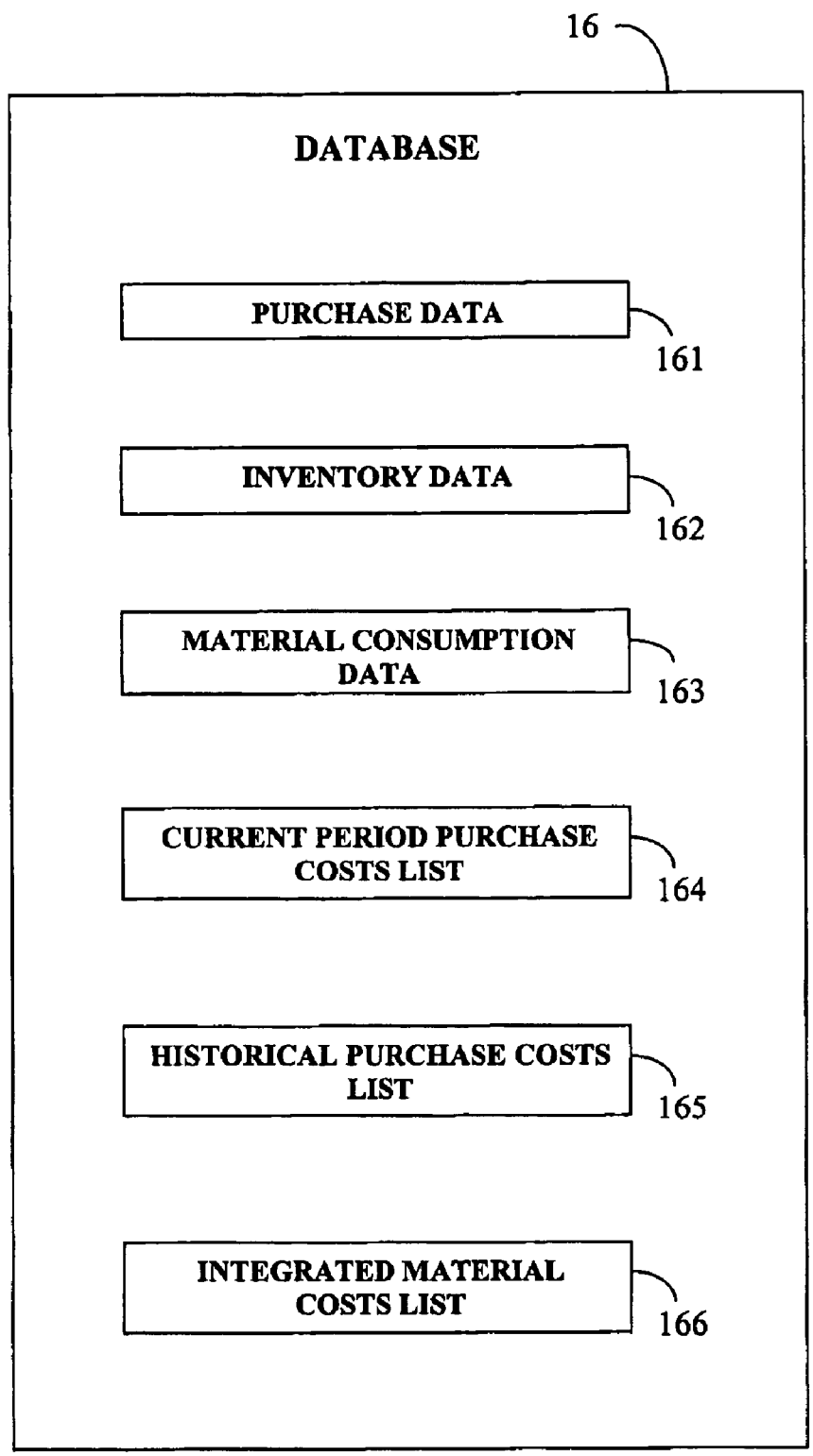
FIG. 3 is a schematic diagram of data structure of a database of the system of FIG. 1.

FIG. 3 is a schematic diagram of data structure of the database 16. The database 16 stores purchase data 161, inventory data 162, material consumption data 163, a current period purchase costs list 164, a historical purchase costs list 165, and an integrated material costs list 166.

The purchase data 161 are obtained from the purchase management system 6. The purchase data 161 include columns for: purchase date, material number, material name, purchase quantity, unit price, and purchase expenses.

The inventory data 162 are obtained from the inventory management system 8, and mainly contain columns for: material number, material name, initial inventory quantity, and initial inventory value.

The material consumption data 163 are obtained from the production management system 9. The material consumption data 163 include columns for: product name, product number, production quantity, and a material consumption list. The material consumption list includes data on material number, material name, and material consumption quantity.

The current period purchase costs list 164 stores relevant information on current period purchase costs. The information includes columns for: material number, material name, total purchase expenses, total purchase quantity, and unit price of materials purchased in the current period.

The historical purchase costs list 165 stores relevant information on historical purchase costs. The information includes columns for: material number, material name, initial inventory value, initial inventory quantity, quantity of purchased materials, unit price of current period purchased materials, and unit price of historical purchased materials.

The integrated material costs list 166 stores relevant information on material costs. Said information includes columns for: product number, product name, product quantity, total material costs, unit material costs, and a material costs list. The material costs list details material costs, and includes columns for: material number, material name, material consumption quantity, unit costs, and material costs value. The unit costs are equal to the unit price of historical purchased materials in the historical purchase costs list 165, and are also equal to the material consumption quantity in the material consumption data 163.

Figures 1, 4:
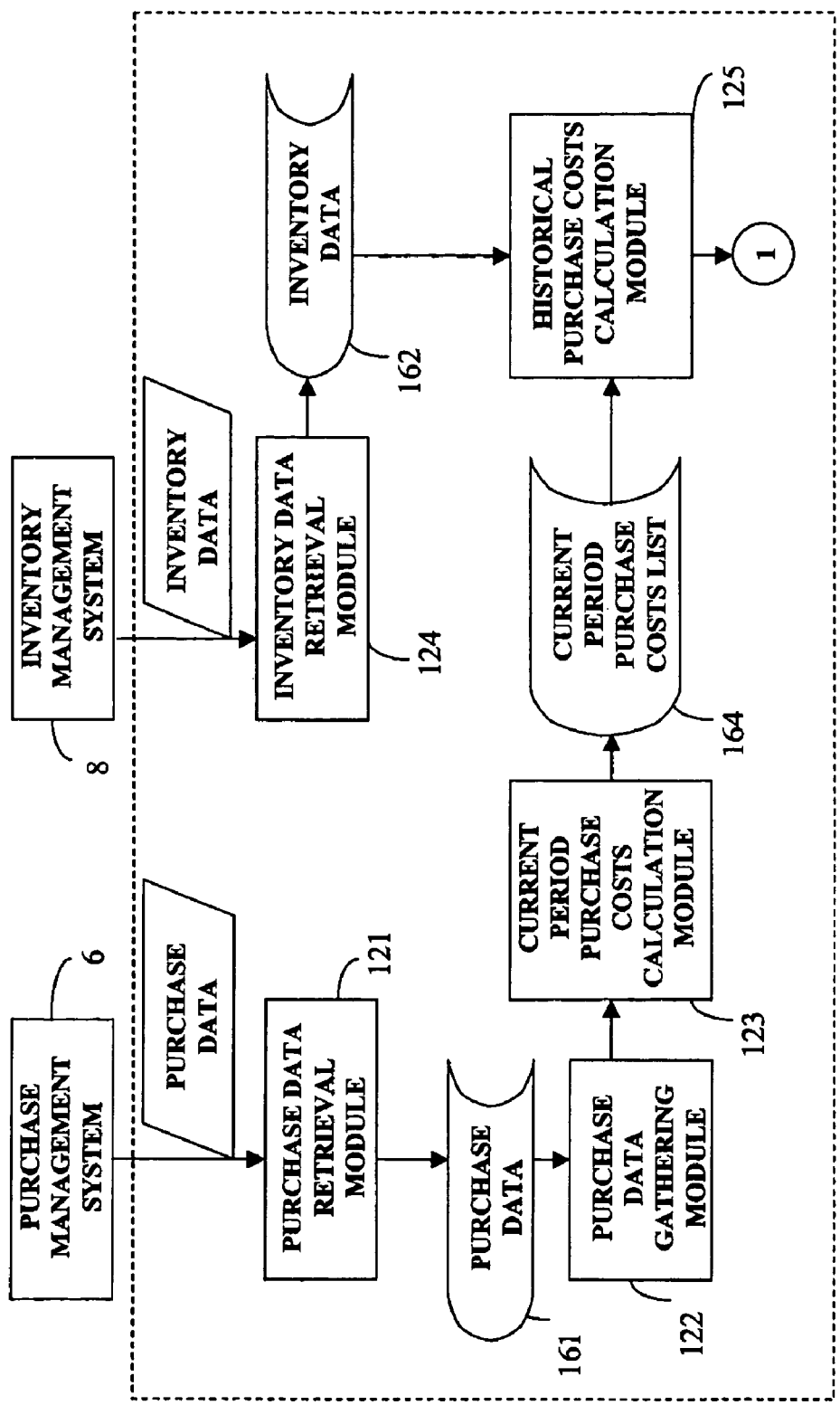
Figures 2, 4:
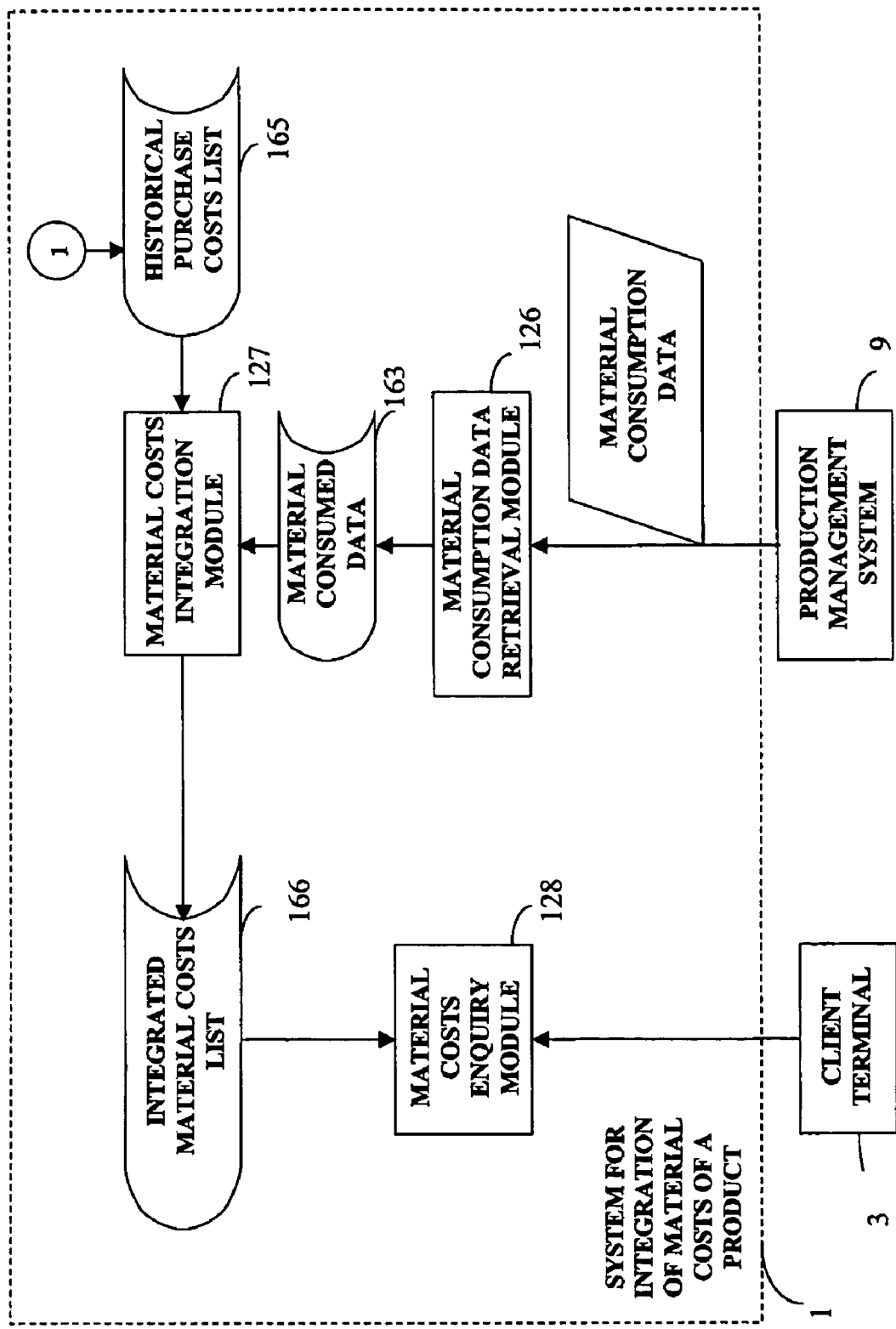

FIGS. 4-1 and 4-2 in combination are a data flowchart in accordance with the preferred embodiment of the present invention. In the preferred embodiment, the purchase data retrieval module 121 generates a purchase data retrieval request based on an accounting period input by cost management personnel, and sends the request to the database server 14. Upon receiving the purchase data retrieval request, the database server 14 accesses the purchase management system 6 to obtain current period purchase data, and stores the data in the purchase data 161 of the database 16.

The purchase data summarizing module 122 summarizes current period purchase data of each material to obtain a purchase quantity, a total purchase value, and total purchase expenses of each material in the current period.

The current period purchase costs calculation module 123 calculates unit purchase expenses apportioned to each unit of each material and a current period's purchase costs of each unit of each material based on the purchase quantity, the total purchase value and the total purchase expenses of each material in the current period gathered by the purchase data summarizing module 122. The formula for calculating purchase expenses of a unit of a material is:

$$E_{UP}=E_{TP}/Q_{TP}$$

where $E_{UP}$ stands for the unit purchase expenses of a material, $E_{TP}$ stands for the total purchase expenses, and $Q_{TP}$ stands for the total purchase quantity.

The formula for calculating purchase costs of a unit of a material for the current period is:

$$C_{UP}=E_{UP}+(E_{TV}/Q_{TP})$$

where $C_{UP}$ stands for the current period purchase costs of a unit of the material, $E_{UP}$ stands for the unit purchase expenses of the material, $E_{TV}$ stands for the total purchase value, and $Q_{TP}$ stands for the total purchase quantity.

The inventory data retrieval module 124 generates an inventory data retrieval request based on the accounting period input by cost management personnel, and sends the request to the database server 14. Upon receiving the inventory data retrieval request, the database server 14 accesses the inventory management system 8 to obtain current period inventory data.

The historical purchase costs calculation module 125 calculates historical purchase costs of each unit of each material based on the initial inventory quantity and the initial inventory value obtained from the inventory data 162, and on the current period purchase quantity the current period purchase costs obtained from the current period purchase costs list 164. The formula for calculating the historical purchase costs of a unit of a material is:

$$C_{UHP}=(A_{II}+Q_P*C_{UP})/(Q_P+Q_{IO})$$

where $C_{UHP}$ stands for the historical purchase costs of a unit of the material, $A_{II}$ stands for the initial inventory value, $Q_P$ stands for the current period purchase quantity, $C_{UP}$ stands for the current purchase costs of a unit of the material, and $Q_{IO}$ stands for the initial inventory quantity.

The material consumption data retrieval module 126 generates a material consumption data retrieval request based on the accounting period input by cost management personnel, and sends the request to the database server 14. Upon receiving the material consumption data retrieval request, the database server 14 accesses the production management system 9 to obtain current period material consumption data.

The material costs integration module 127 calculates costs of each material consumed in a product based on the historical purchase costs of the material obtained from the historical purchase costs list 165. The material costs integration module 127 then sums up the costs of each material consumed in the product to obtain the material costs of the product. The formula for calculating the costs of a material consumed in a product is:

$$C_{CM}=Q_{WM}*C_{UHP}/Q$$

where $C_{CM}$ stands for the costs of the material consumed in the product, $Q_{WM}$ stands for a quantity of consumed material, $C_{UHP}$ stands for the historical purchase costs of a unit of the material, and Q stands for the production output.

The formula for calculating the costs of a material is:

$$C_M=\Sigma C_{CM}$$

where $C_M$ stands for the material costs of the product, and $C_{CM}$ stands for the costs of each material consumed in the product.

The material costs enquiry module 128 can be queried to obtain data on the material costs, the historical purchase costs of each material, and the current period purchase costs of each material. The material costs enquiry module 128 transmits results of each query to the respective client terminal 3.

Figure 5:
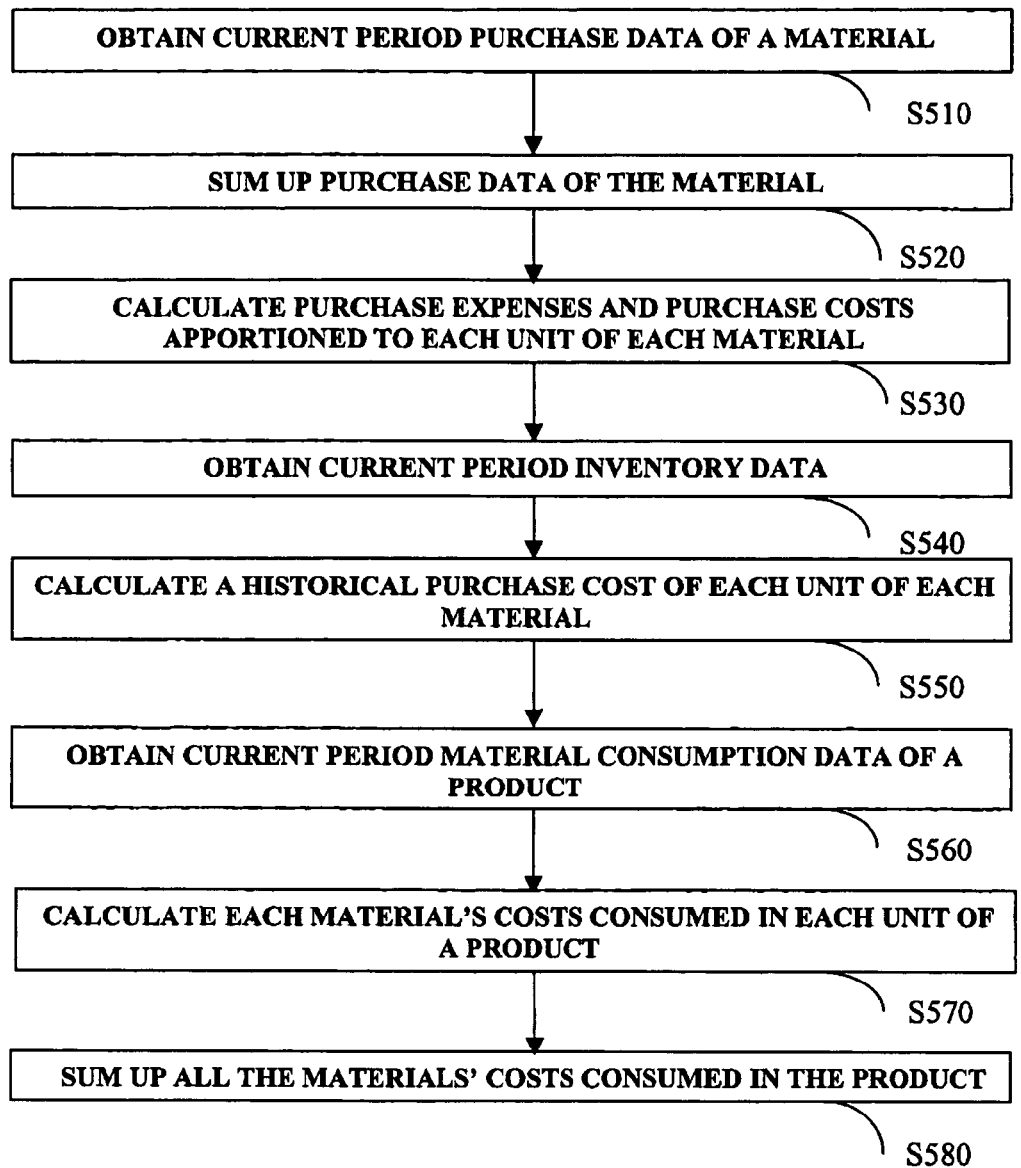
FIG. 5 is a flowchart of preferred operation of the system of FIG. 1.

FIG. 5 is a flowchart of preferred operation of the system 1, in accordance with the present invention. In step S510, the purchase data retrieval module 121 generates a purchase data retrieval request based on an accounting period input by cost management personnel, and sends the request to the database server 14. Upon receiving the purchase data retrieval request, the database server 14 accesses the purchase management system 6 to obtain current period purchase data of a material, and stores the data in the purchase data 161 of the database 16. In step S520, the purchase data summarizing module 122 summarizes purchase data of each material in the current period to obtain a purchase quantity, a total purchase value and total purchase expenses of each material in the current period. In step S530, the current period purchase costs calculation module 123 calculates unit purchase expenses and purchase costs allocated to each unit of each material based on the purchase quantity, total purchase value and total purchase expenses of each material in the current period. In step S540, the inventory data retrieval module 124 generates an inventory data retrieval request based on the accounting period input by cost management personnel, and sends the request to the database server 14. Upon receiving the inventory data retrieval request, the database server 14 accesses the inventory management system 8 to obtain current period inventory data. In step S550, the historical purchase costs calculation module 125 calculates historical purchase costs of each unit of the material based on an initial inventory quantity and inventory value obtained from the purchase data 161, and on a current period purchase quantity and current period purchase costs obtained from the purchase costs list 164. In step S560, the material consumption data retrieval module 126 generates a material consumption data retrieval request based on the accounting period input by cost management personnel, and sends the request to the database server 14. Upon receiving the material consumption data retrieval request, the database server 14 accesses the production management system 9 to obtain current period material consumption data. In step S570, the material costs integration module 127 retrieves a production output and component material consumption quantity of the product, and calculates costs of the material consumed in each unit of the product based on the historical purchase costs of the material obtained from the historical purchase costs list 165. In step S580, the material costs integration module 127 then sums up the costs of the material consumed in the product to obtain material costs of the product.

Although only preferred embodiments of the present invention have been described in detail above, those skilled in the art will readily appreciate that many modifications to the preferred embodiments are possible without materially departing from the novel teachings and advantages of the present invention. Accordingly, all such modifications are deemed to be covered by the following claims and allowable equivalents of the claims.

What is claimed is:

1. A system for integration of material costs of a product for calculating costs of a product based on purchase data, inventory data and material consumption data, the system comprising a web server and a database server, wherein:
   the database server is connected to a purchase management system, an inventory management system, and a production management system via a network for data transmission therebetween, and the database server comprises a database for storing purchase data, inventory data and material consumption data, the purchase data include columns for: quantity of purchased material, unit price of purchased material, and purchase expense, the inventory data include columns for: initial inventory quantity and initial inventory value of each material, and the material consumption data include columns for: a current period production quantity and a material consumption quantity of each product; and
   the web server has an application layer that comprises enterprise plans, operation methods, and management models, and the web server comprises:
   a current period purchase costs calculation module for calculating purchase expenses and purchase costs apportioned to each unit of each material in a current period;
   a historical purchase costs calculation module for calculating historical purchase costs of each material by utilizing the formula $C_{UHP}=(A_{II}+Q_P*C_{UP})/(Q_P+Q_{IO})$, wherein $C_{UHP}$ stands for the historical purchase costs, $A_{II}$ stands for initial inventory value, $Q_P$ stands for current period purchase quantity, $C_{UP}$ stands for current purchase costs, and $Q_{IO}$ stands for initial inventory quantity; and
   a material costs integration module for calculating material costs consumption in each unit of a product.

2. The system for integration of material costs of a product as claimed in claim 1, wherein the web sewer farther comprises a purchase data summarizing module for summing up purchase data of each material to obtain a current period's total purchase quantity, total purchase value and total purchase expenses of each material.

3. The system for integration of material costs of a product as claimed in claim 1, wherein the web server further comprises a purchase data retrieval module for obtaining current period purchase data from the purchase management system.

4. The system for integration of material costs of a product as claimed in claim 3, wherein the web sewer farther comprises an inventory data retrieval module for obtaining current period inventory data from the inventory management system.

5. The system for integration of material costs of a product as claimed in claim 4, wherein the web sewer farther comprises a material consumption data retrieval module for obtaining current period material consumption data of products from the production management system.

6. The system for integration of material costs of a product as claimed in claim 1, wherein the web server further comprises a material costs enquiry module for obtaining data on each material's costs, the historical purchase costs of each material, and the current period purchase costs of the material.

7. A computer-enabled method for integration of material costs for calculating material costs of a product based on purchase data, inventory data, and material consumption data, the method comprising the steps of:
   connecting a database server to a purchase management system, an inventory management system, and a production management system via a network for data transmission therebetween;
   obtaining purchase data from the purchase management system and storing the purchase data in a database by using a purchase data retrieval module installed in a web server;
   calculating unit purchase expenses and current purchase costs of a unit of each material based on the purchase data by using a current period purchase costs calculation module installed in the web server;
   obtaining inventory data from the inventory management system, and storing the inventory data in the database by using an inventory data retrieval module installed in the web server;
   calculating historical purchase costs of a unit of each material based on the inventory data by using a historical purchase costs calculation module installed in the web server, wherein the historical purchase costs calculation module calculates the historical purchase costs according to the formula $C_{UHP}=(A_{II}+Q_P*C_{UP})/(Q_P+Q_{IO})$, where $C_{UHP}$ stands for the historical purchase costs, $A_{II}$ stands for initial inventory value, $Q_P$ stands for current period purchase quantity, $C_{UP}$ stands for the current purchase costs, and $Q_{IO}$ stands for initial inventory quantity;
   obtaining material consumption data from the production management system and storing the material consumption data in the database by using a material consumption data retrieval module installed in the web server;
   calculating costs of each material consumed in the product based on the material consumption data by utilizing a material costs integration module installed in the web server, wherein the material costs integration module calculates the costs of each material consumed in the product according to the formula $C_{CM}=Q_{WM}*C_{UHP}/Q$, where $C_{CM}$ stands for the costs of each material consumed in the product, $Q_{WM}$ stands for a quantity of consumed material, $C_{UHP}$ stands for the historical purchase costs of a unit of the material, and Q stands for production output; and
   summing up the costs of each material consumed in the product to obtain material costs of the product by using a purchase data summarizing module installed in the web sewer; and
   returning the material costs of the product to a client terminal of a company by using the web server.

8. The method for integration of material costs of a product as claimed in claim 7, wherein the step of obtaining purchase data is performed by accessing the purchase management system.

9. The method for integration of material costs of a product as claimed in claim 7, wherein the step of obtaining inventory data is performed by accessing the inventory management system.

10. The method for integration of material costs of a product as claimed in claim 7, wherein the step of obtaining material consumption data is performed by accessing the production management system.

11. The method for integration of material costs of a product as claimed in claim 7, farther comprising the following step after the step of obtaining purchase data and storing the purchase data in a database: summing up purchase data of each material in a current period.

12. The method for integration of material costs of a product as claimed in claim 7, wherein calculating unit purchase expenses of a unit of each material is performed by utilizing the formula $E_{UP}=E_{TP}/Q_{TP}$, where $E_{UP}$ stands for the unit purchase expenses, $E_{TP}$ stands for total purchase expenses, and $Q_{TP}$ stands for total purchase quantity.

13. The method for integration of material costs of a product as claimed in claim 7, wherein calculating current purchase costs of a unit of each material is performed by utilizing the formula $C_{UP}=E_{UP}+(E_{TV}/Q_{TP})$, where $C_{UP}$ stands for the current purchase costs, $E_{UP}$ stands for the unit purchase expenses, $E_{TV}$ stands for total purchase value, and $Q_{TP}$ stands for total purchase quantity.

\* \* \* \* \*